United States Patent
Bunderson et al.

(10) Patent No.: US 9,974,225 B2
(45) Date of Patent: *May 22, 2018

(54) SYSTEM AND METHOD FOR GENERATING AND IMPLEMENTING AN END-OF-ROW TURN PATH

(71) Applicants: CNH Industrial America LLC, New Holland, PA (US); Autonomous Solutions, Inc., Mendon, UT (US)

(72) Inventors: Nathan Eric Bunderson, Providence, UT (US); Daniel John Morwood, Petersboro, UT (US); Brian Robert Ray, Chicago, IL (US); Peter John Dix, Naperville, IL (US); Brendan Paul McCarthy, Willowbrook, IL (US); Bret Todd Turpin, Wellsville, UT (US); Brett McClelland, Chicago, IL (US)

(73) Assignees: CNH Industrial America LLC, New Holland, PA (US); Autonomous Solutions, Inc., Mendon, UT (US)

(*) Notice: Subject to any disclaimer, the term of this patent is extended or adjusted under 35 U.S.C. 154(b) by 149 days.

This patent is subject to a terminal disclaimer.

(21) Appl. No.: 14/995,923

(22) Filed: Jan. 14, 2016

(65) Prior Publication Data

US 2017/0202131 A1    Jul. 20, 2017

(51) Int. Cl.
*A01B 69/04* (2006.01)
*A01B 79/00* (2006.01)
(Continued)

(52) U.S. Cl.
CPC .......... *A01B 69/008* (2013.01); *A01B 79/005* (2013.01); *B60W 10/04* (2013.01);
(Continued)

(58) Field of Classification Search
CPC .... A01B 69/008; A01B 79/005; B60W 30/10; B60W 10/20; B60W 10/04;
(Continued)

(56) References Cited

U.S. PATENT DOCUMENTS

| 6,141,614 A | 10/2000 | Janzen et al. |
| 7,277,792 B2 | 10/2007 | Overschie |

(Continued)

OTHER PUBLICATIONS

Scheuer et al; °Continuous-Curvature Path Planning for Car-Like Vehicles;° IEEE-RSJ International Conference on Intelligent Robots and Systems; Jun. 30, 1997, 8 pages.

(Continued)

*Primary Examiner* — Russell Frejd
(74) *Attorney, Agent, or Firm* — Rebecca L. Henkel; Rickard K. DeMille (57) ABSTRACT

A method includes generating a non-continuous curvature end-of-row turn path for an agricultural vehicle, wherein the non-continuous curvature end-of-row turn path includes a plurality of initial segments that are curved or straight, adding at least one continuity segment between each of the initial segments, wherein the at least one continuity segment is a clothoid segment, and the initial segments and the at least one continuity segment combine to form a continuous curvature end-of-row turn path, and implementing the continuous end-of-row turn path, displaying the continuous end-of-row turn path, or both.

20 Claims, 8 Drawing Sheets

(51) Int. Cl.
  *B60W 30/10* (2006.01)
  *B60W 10/20* (2006.01)
  *B60W 10/04* (2006.01)
  *G01C 21/10* (2006.01)
  *G05D 1/02* (2006.01)

(52) U.S. Cl.
  CPC ............ *B60W 10/20* (2013.01); *B60W 30/10* (2013.01); *G01C 21/10* (2013.01); *G05D 1/0212* (2013.01); *G05D 1/0217* (2013.01); *G05D 1/0219* (2013.01); *G05D 1/0223* (2013.01); *B60W 2300/15* (2013.01)

(58) Field of Classification Search
  CPC . B60W 2300/15; G01C 21/10; G05D 1/0219; G05D 1/0223; G05D 1/0212; G05D 1/0217
  See application file for complete search history.

(56) References Cited

U.S. PATENT DOCUMENTS

| | | | |
|---|---|---|---|
| 7,477,988 B2 | 1/2009 | Dorum | |
| 7,505,848 B2 | 3/2009 | Flan et al. | |
| 7,747,370 B2 | 6/2010 | Dix | |
| 7,860,592 B2 | 12/2010 | Kimura et al. | |
| 8,948,958 B1 | 2/2015 | Ferguson et al. | |
| 9,020,757 B2 * | 4/2015 | Peake | B62D 15/025 180/204 |
| 2009/0144030 A1 | 6/2009 | Witmer | |
| 2013/0006473 A1 | 1/2013 | Buerkle et al. | |
| 2014/0236482 A1 | 8/2014 | Dorum et al. | |
| 2014/0350650 A1 | 11/2014 | Kmiecik et al. | |
| 2015/0342110 A1 * | 12/2015 | Peake | A01B 79/005 701/50 |
| 2015/0346728 A1 * | 12/2015 | Peake | G05D 1/0212 701/23 |
| 2016/0363936 A1 * | 12/2016 | Peake | G05D 1/0212 |

OTHER PUBLICATIONS

Ferguson, David; "Path Generation and Control for End of Row Turning in an Orchard Environment;" Carnegie-Mellon Robotics Institute Master Thesis; Aug. 16, 2010, 34 pages.

Subbiah, S; "Robust Autonomous Guidance for Citrus Groves:" University of Florida Master Thesis, 2010, 119 pages.

Backman et al; "Path Generation Method with Steering Rate Constraint;" Department of Automation and Systems Technology, School of Electrical Engineering, Aalto University, Espoo, Finland; Jul. 2012, 15 pages.

U.S. Appl. No. 15/098,131, filed Apr. 13, 2016, Nathan Eric Bunderson.

U.S. Appl. No. 15/179,753, filed Jun. 10, 2016, Peter John Dix.

* cited by examiner

SYSTEM AND METHOD FOR GENERATING AND IMPLEMENTING AN END-OF-ROW TURN PATH

BACKGROUND

This disclosure relates generally to agricultural vehicle guidance systems, and more particularly to generating and implementing end-of-row turn paths for an agricultural vehicle.

Agricultural vehicles (e.g., tractors, harvesters, etc.) are commonly used in a variety of agricultural tasks (e.g., to tow planters or seeders for planting seeds, to tow spraying implements for applying fertilizer, for harvesting agricultural product, etc.). Traditionally, agricultural vehicles have been manually operated by the operator. That is, the steering and speed of an agricultural vehicle have been controlled by an operator driving the vehicle. Recent developments integrating GPS-based navigation systems into agricultural vehicle control systems have enabled automatic or semi-automatic steering modes. For example, some agricultural vehicles may include a control system configured to automatically direct the vehicle to follow a path between, over, or adjacent to rows in a field. For many such control systems, end-of-row turns are executed manually. For example, when the agricultural vehicle reaches the end of a first swath or row, the operator raises, turns off, or otherwise disengages the agricultural implement; the operator then manually controls the speed and steering of the agricultural vehicle to guide the vehicle through the end-of-row turn connecting the end of the first swath to the beginning of a second swath or row. The operator then lowers, turns on, or otherwise engages the agricultural implement and an automatic or semi-automatic control system guides the agricultural vehicle along the second path. The operator may not follow the most efficient path through the end-of-row turn. Small errors in heading or path through the end-of-row turn can lead to large corrections in heading and alignment while initiating automatic guidance at the beginning of a subsequent swath. Additionally, if the implement is not aligned with the subsequent swath at the time the implement is lowered or turned on, the implement may miss a portion of the subsequent swath, creating a skip, and/or overlap with another swath. Skips (e.g., missed sections of a swath) may result in weeds growing, time lost due to backing up and repositioning the vehicle, and/or time lost to filling in by hand. These errors and corrections may result in significantly reduced efficiency of agricultural operations.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment a method includes generating a non-continuous curvature end-of-row turn path for an agricultural vehicle, wherein the non-continuous curvature end-of-row turn path includes a plurality of initial segments that are curved or straight, adding at least one continuity segment between each of the initial segments, wherein the at least one continuity segment is a clothoid segment, and the initial segments and the at least one continuity segment combine to form a continuous curvature end-of-row turn path, and implementing the continuous end-of-row turn path, displaying the continuous end-of-row turn path, or both.

In another embodiment a system includes an agricultural vehicle steering system, navigation system, and an agricultural vehicle control system. The agricultural vehicle steering system controls a direction of travel of an agricultural vehicle. The navigation system determines a location, heading, speed, etc. of the agricultural vehicle. The agricultural vehicle control system is in communication with the agricultural steering system and the navigation system. The agricultural vehicle control system is configured to generate a continuous rate of curvature end-of-row turn path for the agricultural vehicle based at least in part on the agricultural vehicle information received from the navigation system, a minimum turning radius of the agricultural vehicle, and a maximum turning rate of the agricultural vehicle, wherein the continuous rate of curvature end-of-row turn path comprises a clothoid spline having one or more clothoid segments, and implement the continuous rate of curvature end-of-row turn path via the agricultural vehicle steering system.

In a further embodiment a non-transitory computer readable medium comprising executable instructions that when executed cause a processor to generate a non-continuous curvature end-of-row turn path for an agricultural vehicle, wherein the non-continuous curvature end-of-row turn path comprises a plurality of initial segments that are curved or straight, add at least one continuity segment between each of the plurality of initial segments, wherein the at least one continuity segment includes a clothoid segment, and the initial segments and the at least one continuity segment combine to form a continuous curvature end-of-row turn path, shorten or lengthen each of the initial segments and the at least one continuity segment for a desired speed of the agricultural vehicle, and implement the continuous end-of-row turn, display the continuous end-of-row turn path, or both.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In many agricultural operations, agricultural vehicles are commonly used to perform a variety of tasks (e.g., towing planters or seeders for planting seeds, towing spraying implements for applying fertilizer, harvesting agricultural product, plowing, preparing beds, etc.) in order to increase the efficiency or output of the agricultural operation. The agricultural vehicle may include an agricultural implement (e.g., combines, windrowers, forage harvesters, sugar can harvesters, etc.), or may tow an agricultural implement. The agricultural vehicle may have a vehicle control system that utilizes GPS-based navigation to automatically guide a vehicle along a swath or a path between, over, or adjacent to rows in an agricultural field. In such vehicle systems, end-of-row turns are executed manually. For example, when the agricultural vehicle reaches the end of a first swath, the operator raises, turns off, or otherwise disengages the agricultural implement; the operator then manually controls the speed and steering of the agricultural vehicle to guide the vehicle through the end-of-row turn connecting the end of the first swath to the beginning of a second swath. The operator then lowers, turns on, or otherwise engages the agricultural implement and an automatic or semi-automatic control system guides the agricultural vehicle along the second swath. The operator may not follow the most efficient path through the end-of-row turn. Indeed, small errors in heading or path through the end-of-row turn can lead to large corrections in heading and alignment while initiating automatic guidance at the beginning of a subsequent swath. If the implement is not aligned with the subsequent swath at the time the implement is lowered or turned on, the implement may miss a portion of the subsequent swath, creating a skip, and/or overlap with another swath. Skips (e.g., missed sections of a swath) may result in weeds growing, time lost due to backing up and repositioning the vehicle, and/or time lost to filling in by hand. These errors and corrections may result in significantly reduced efficiency of agricultural operations.

Present embodiments of the vehicle control system may generate a continuous curvature end of row turn path for the agricultural vehicle. The vehicle control system may take into account a number of factors (e.g., minimum turning radius, maximum turning rate, starting point, initial heading, speed, fuel consumption, etc.) in determining the end of row turn path. The end-of-row-turn path may include a number of clothoid segments arranged end-to-end. In some embodiments, the vehicle control system may implement the end-of-row turn path (e.g., guide the vehicle along the end-of-row turn path). Advantages of the disclosed techniques include the generation of an end-of-row turn path that takes the shortest amount of time to follow, but is still within the capabilities of the agricultural vehicle. As a result, the efficiency of the agricultural operation may be increased.

Figure 1:
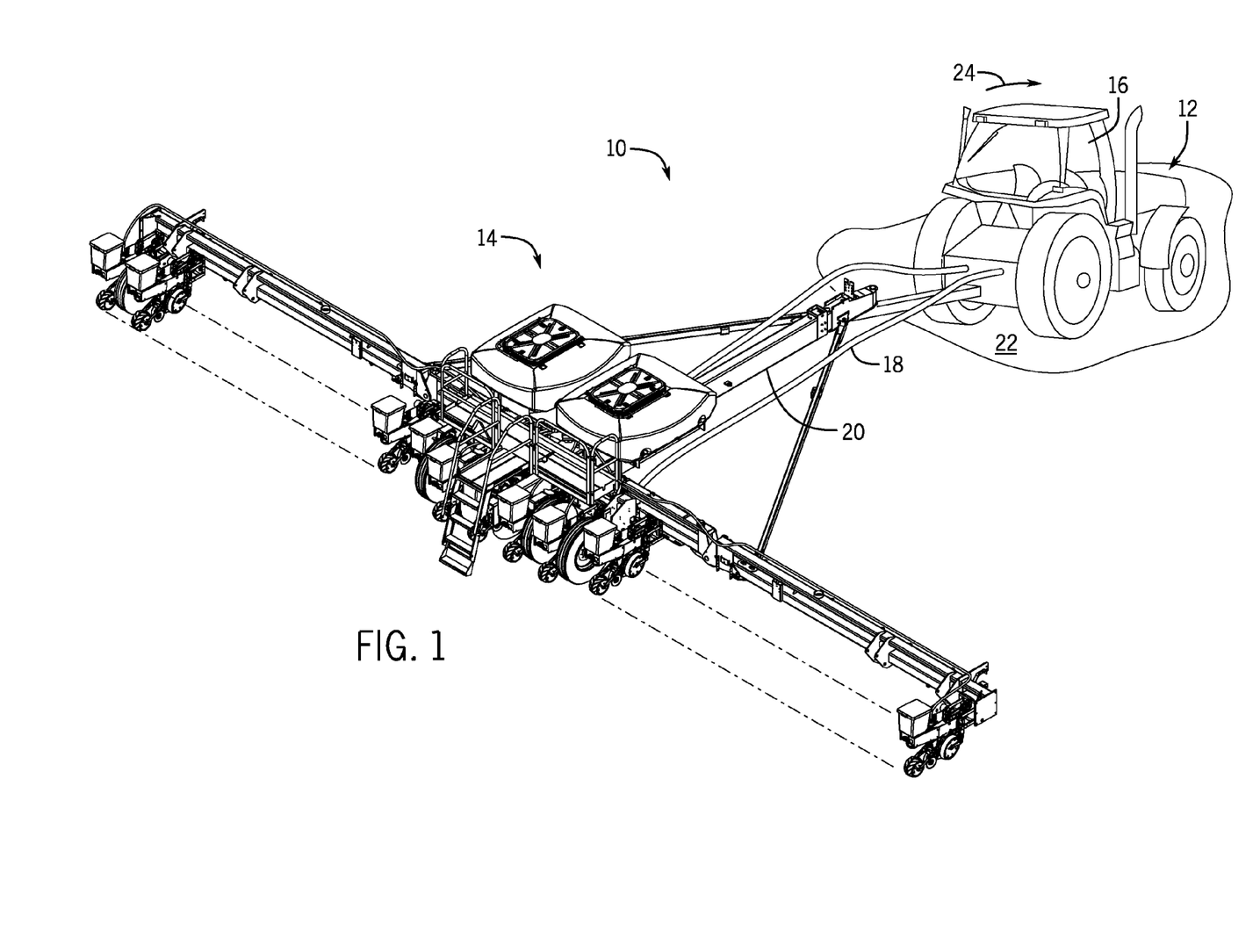
FIG. 1 is a perspective view of an embodiment of an agricultural system.

FIG. 1 is a perspective view of an embodiment of an agricultural system 10. The agricultural system 10 includes an agricultural vehicle 12 and an agricultural implement 14. In some embodiments, the agricultural implement 14 may be towed behind the agricultural vehicle 12 (e.g., as shown in FIG. 1). In other embodiments, the agricultural implement 14 may be incorporated into the agricultural vehicle 12 (e.g., combines, windrowers, forage harvesters, sugar can harvesters, etc.). The agricultural vehicle 12 may be any vehicle suitable for towing the agricultural implement 14, such as a tractor, off-road vehicle, work vehicle, or the like. The agricultural vehicle 12 may include a cab 16, in which an operator sits during operation of the agricultural vehicle 12. The cab 16 may be an open or closed cab 16. Additionally, the agricultural implement 14 may be any suitable implement, such as a ground-engaging implement (e.g., a soil conditioner, a tillage implement, a fertilizer application implement, a planter, a seeder, etc.) or a sprayer/applicator, suitable for agricultural use. The agricultural implement 14 may be coupled to the agricultural vehicle 12 via a hitch 18. In one embodiment, the hitch 18 may be a three-point hitch that rigidly couples the implement 14 to the vehicle 12, such that the implement 14 can move upward and downward, but cannot freely rotate with respect to the vehicle 12. In another embodiment, the implement 14 may be coupled to the vehicle 12 via a drawbar, allowing the implement 14 upward, downward, and rotate with respect to the vehicle 12. It should be understood, however that other systems for coupling the implement 14 to the vehicle 12 may be possible. In some embodiments, the implement 14 may be coupled to the front of the vehicle 12. In the illustrated embodiment, the agricultural implement 14 is attached to the tow vehicle 12 via a frame 20 and the hitch 18. The agricultural system 10 travels over the surface 22, such as the ground, a road, a field, or another surface. The vehicle 12 is configured to tow the agricultural implement 14 in a direction of travel 24.

Figure 2:
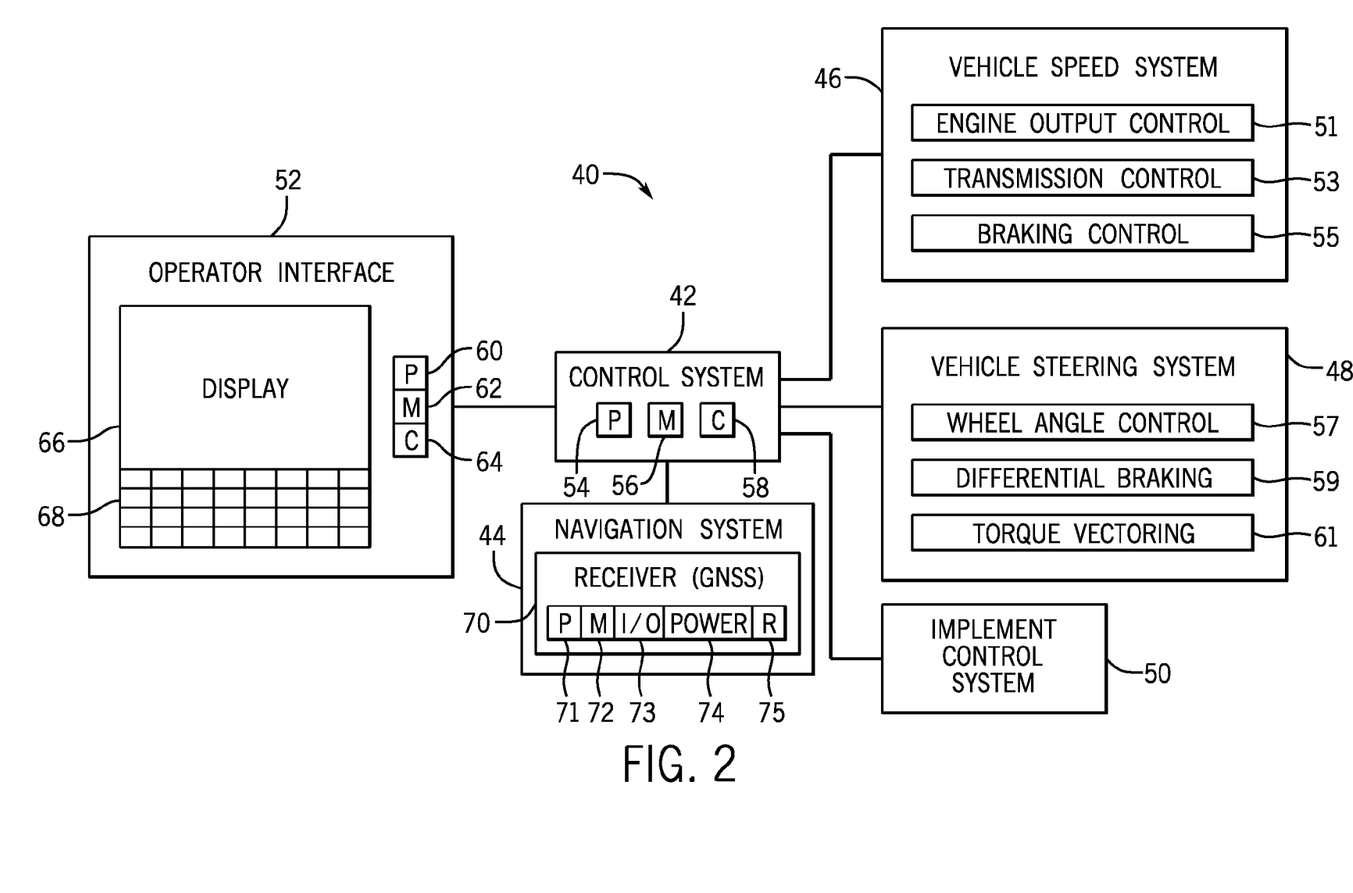
FIG. 2 is a schematic view of one embodiment of a control system of the agricultural system shown in FIG. 1.

FIG. 2 is a schematic view of one embodiment of a control system 40 of the agricultural system 10 shown in FIG. 1. In the illustrated embodiment, the control system 40 includes an agricultural vehicle control system 42, a navigation system 44, a vehicle speed system 46, a vehicle steering system 48, an implement control system 50, and an operator interface 52. However, it should be understood that other embodiments of the control system 40 may include different elements in alternative combinations.

The vehicle control system 42 may include a processor 54, a memory component 56, and communication circuitry 58. The processor 54 may include one or more general-purpose processors, one or more application specific integrated circuits, one or more field programmable gate arrays, or the like. The memory 56 may be any tangible, non-transitory, computer readable medium that is capable of storing instructions executable by the processor 54 and/or data that may be processed by the processor 54. In other words, the memory 56 may include volatile memory, such as random access memory, or non-volatile memory, such as hard disk drives, read-only memory, optical disks, flash memory, and the like. The communication circuitry 58 may be configured to receive inputs (e.g., feedback signals, sensor signals, etc.) and transmit outputs (e.g., control signals, command signals, etc.) to the navigation system 44, the vehicle speed system 46, the vehicle steering system 48, the implement control system 50, and the operator interface 52.

The navigation system 44 may be in communication with the vehicle control system 42 (e.g., via the communication circuitry 58). The navigation system may include a Global Navigation Satellite System (GNSS) receiver 70 configured to communicate with two or more satellites in orbit (e.g., GPS, GLONASS, Galileo, BeiDou, etc.) to determine the location, heading, speed, etc. of the vehicle 12. The receiver 70 may include one or more processors 71, a memory component 72, input/output 73, a power supply 74, and radio circuitry 75. The processors 71 may run software stored on the memory component 72 to compute the position of the vehicle 12. Based on the computed position, the processor may also determine vehicle 12 heading, speed, etc. Based on the agricultural vehicle 12 information received from the navigation system 44, the vehicle control system 42 may determine (e.g., via the processor 54) the relative proximity to one or more rows or swaths, one or more boundaries, one or more headlands, etc. Based on the position of the agricultural vehicle 12 received from the navigation system 44, the vehicle control system 42 may also determine a path between, over, or along a row, an end-of-row turn path from one swath to another, or a path to the nearest swath.

The vehicle speed system 46 may control the speed of the agricultural vehicle 12 in the direction of travel 24. Control of the speed may be by control of a throttle, control of a clutch, brakes, a transmission, control of one or more other systems, or a combination thereof. In the illustrated embodiment, the speed control system 40 includes an engine output control system 51, a transmission control system 53, and a braking control system 55. The engine output control system 51 is configured to vary the output of an engine to control the speed of the vehicle 12. For example, the engine output control system 51 may vary a throttle setting of the engine, a fuel/air mixture of the engine, a timing of the engine, and/or other suitable engine parameters to control engine output. In addition, the transmission control system 53 may adjust gear selection within a transmission to control the speed of the vehicle 12. For example, the transmission control system 53 may allow for manual or automatic changing of gears or a gear ratio via the transmission as a way to control the speed of the vehicle 12. The transmission may include a number of fixed gear ratios or a continuously variable gear ratio. Furthermore, the braking control system 55 may adjust braking force, thereby controlling the speed of the vehicle 12 (e.g., slow the vehicle down at the end of a row in order to make a turn). While the illustrated vehicle speed system 46 includes the engine output control system 51, the transmission control system 53, and the braking control system 55, it should be appreciated that alternative embodiments may include any of these systems, in any suitable combination. Further embodiments may include a vehicle speed system 46 having other and/or additional systems to facilitate adjusting the speed of the vehicle 12. The vehicle speed system 46 may be controlled by the operator in a manual mode of operation. In an automatic or semi-automatic mode of operation, the vehicle speed system 46 may be controlled automatically or semi-automatically by the vehicle control system 42.

The vehicle steering system 48 may control the steering of the agricultural vehicle 12. In the illustrated embodiment, the vehicle steering system 48 includes a wheel angle control system 57, a differential braking system 59, and a torque vectoring system 61. The wheel angle control system 57 may automatically rotate one or more wheels or tracks of the vehicle 12 (e.g., via mechanical or hydraulic actuators) to steer the vehicle 12 along a path. By way of example, the wheel angle control system 57 may rotate front wheels/tracks, rear wheels/tracks, and/or intermediate wheels/tracks of the vehicle 12, either individually or in groups. In some embodiments, steering may be accomplished by varying the speed of wheels or tracks on either side of the vehicle. In some embodiments, the wheel angle control system 57 may be hydraulically actuated rather than, or in addition to, mechanically actuated (e.g., via gears). A hydraulically actuated steering system 48 may enable the agricultural vehicle 12 to turn without corresponding movement of a steering wheel (or other steering input device) inside the cab 16 during an automatic or semi-automatic drive mode. The differential braking system 59 may independently vary the braking force on each side of the vehicle 12 to direct the vehicle 12 along the path. Similarly, the torque vectoring system 61 may differentially apply torque from the engine to wheels and/or tracks on each side of the vehicle 12, thereby directing the vehicle 12 along the path. While the illustrated vehicle steering system 48 includes the wheel angle control system 57, the differential braking system 59, and the torque vectoring system 61, it should be appreciated that alternative embodiments may include any of these systems, in any suitable combination. Further embodiments may include a vehicle steering system 48 having other and/or additional systems to facilitate directing the vehicle 12 along the path (e.g., an articulated steering system, etc.). The vehicle steering system 48 may be controlled by the operator in a manual mode of operation. In an automatic or semi-automatic mode of operation, the vehicle steering system 48 may be controlled automatically by the vehicle control system 42. For example, in a semi-automatic mode of operation, the steering system 48 may be automatically controlled by the vehicle control system 42, and the speed system 46 may be controlled by the operator. In a fully automatic mode of operation, both the speed system 46 and the steering system 48 may be controlled by the control system 42.

The implement control system 50 may be used to control the implement 14. For example, the implement control system 50 may raise or lower the implement 14, turn the implement 14 on or off, or otherwise engage or disengage the implement 14, deploy ground-engaging tools of the implement 14, control the speed of the implement 14, etc., or a combination thereof.

The operator interface 52 may be disposed inside the cab 16 of the vehicle 12 and be configured to display information for, and receive inputs from, the operator. In the illustrated embodiment, the operator interface 52 includes a processor 60, a memory component 62, communication circuitry 64, a display 66, and operator inputs 68. The processor 60 may include one or more general-purpose processors, one or more application specific integrated circuits, one or more field programmable gate arrays, or the like. The memory 62 may be any tangible, non-transitory, computer readable medium that is capable of storing instructions executable by the processor 60 and/or data that may be processed by the processor 60. The memory 62 may include volatile memory, such as random access memory, or non-volatile memory, such as hard disk drives, read-only memory, optical disks, flash memory, and the like. The communication circuitry 64 may be configured to communicate with the vehicle control system 42 (e.g., via the communication circuitry 58 of the vehicle control system 42). In some embodiments, the communication circuitry 58, 64 may communicate with various components in the system 10 wirelessly. In some embodiments, the operator interface 52 and the vehicle control system 42 may be disposed within the same housing, may share processors 54, 60, memory components 56, 62, and/or communication circuitry 58, 64. In further embodiments, the vehicle control system 42 and the operator interface 52 may be the same component. The operator interface 52 includes a display 66 configured to display information related to the agricultural system 10 to the operator. The display 66 may be a screen, an array of LEDs, a series of gauges, a combination thereof, or some other arrangement. The operator interface 52 also includes an operator input 68 that enables a user to input information. The operator input 68 may be a keyboard, a series of buttons, a joystick, a mouse, a track pad, etc. In some embodiments, the display 66 and the operator input 68 may be a single component (e.g., a touchscreen).

Based on inputs received from the operator interface 52 and the navigation system 44, or other sensors disposed throughout the system 10, as well as inputs that may be stored in the memory component 56, the vehicle control system may generate a path for the agricultural vehicle 12, and in some cases automatically or semi-automatically control the various systems 46, 48, 50 to guide the vehicle 12 along the path.

Figure 3:
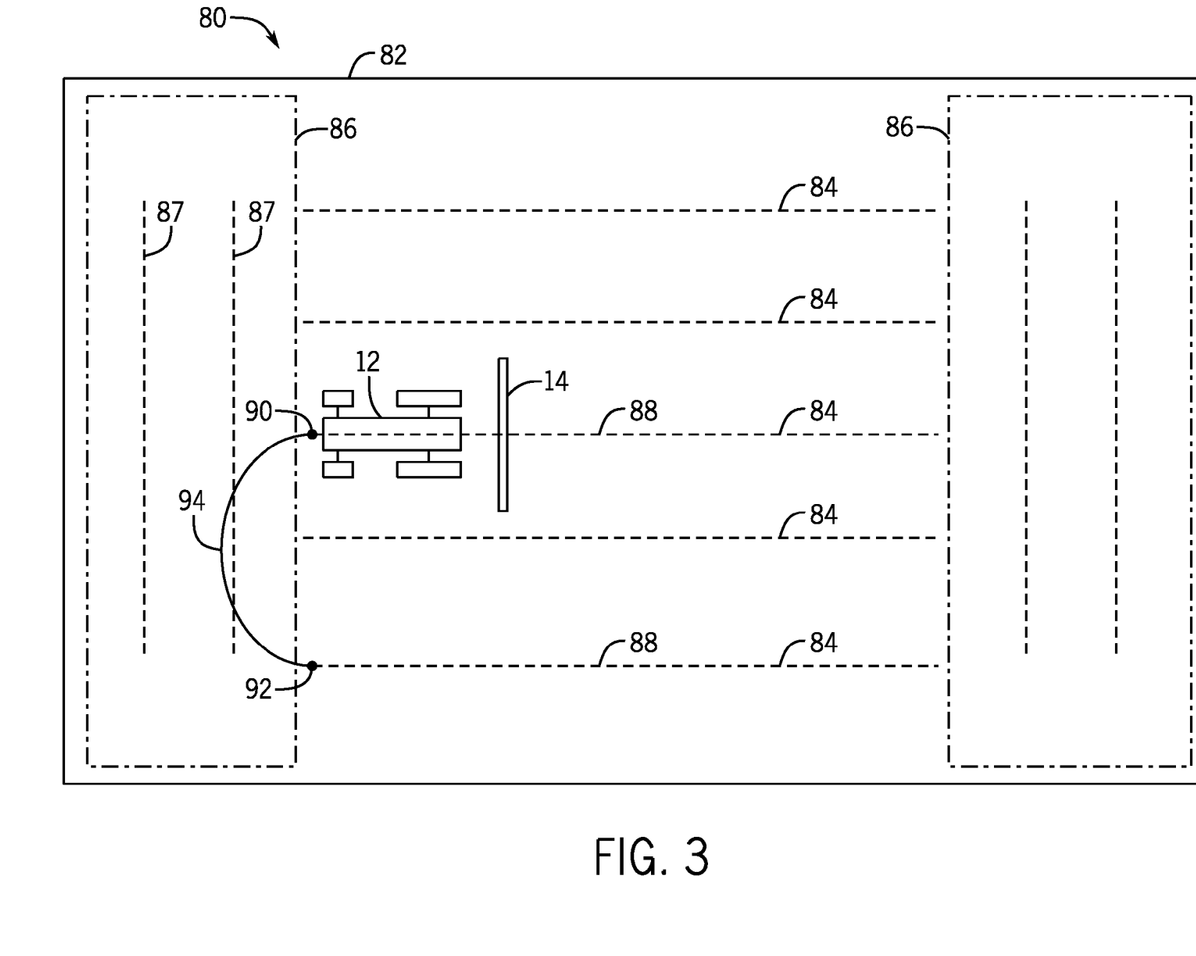
FIG. 3 is a schematic view of the agricultural system performing a task on a field, in accordance with an embodiment.

FIG. 3 is a schematic view of an agricultural vehicle 12 performing a task on a field 80. The field 80 may be defined by a boundary 82. The boundary 82 may be a physical boundary 82 (e.g., a fence, a creek, a ravine, etc.) or a virtual boundary 82 that defines the field 80. The field 80 may include a multiple rows 84 in which agricultural product is grown. Though the rows 84 depicted in FIG. 3 are straight, in some applications, the rows 84 may be curved. In some embodiments, curved rows 84 may be useful in fields 80 having curved boundaries 82, curved geographical features, terraces, etc. Similarly, though the rows 84 shown in FIG. 3 are parallel to one another, the rows 84 need not be parallel to one another to utilize the disclosed techniques. Headlands 86 may be disposed at the ends of the rows 84 or adjacent to the rows 84 in order to facilitate end of row turns by the agricultural vehicle 12. The headlands 86 may or may not be used to grow agricultural product. For example, the headlands 86 may include a number of headland rows 87 that are parallel to the boundary 82 (e.g., fence). Paths 88 may be defined over, between, or adjacent to one or more rows 84. The agricultural vehicle 12 may be automatically, semi-automatically, or manually controlled by the operator to follow the one or more paths 88 along the one or more rows 84.

Upon reaching an end point 90 of a first path 88, the agricultural vehicle 12 may proceed to a starting point 92 of a second path 88 by following an end-of-row turn path 94. For example, when the vehicle 12 or the implement 14 reaches the end point 90 of the first path 88, the implement may be raised, turned off, or otherwise disengaged via the implement control system 50. This may be performed automatically by the vehicle control system 42, or by the operator via the operator interface 52. The end-of row turn may include one or more other operator-triggered actions (e.g., varying engine speed, turning PTO off or on, raising markers, folding the implement, turning hydraulic remotes off or on, etc.), some of which may or may not affect the speed of the vehicle 12. The vehicle then follows the end-of-row turn path 94 to the starting point 92 of the second path 92. The implement 14 is then lowered, turned on, or engaged, and the vehicle proceeds along the second path 88.

A variety of systems are available for performing the end-of-row turn. Traditionally, the vehicle 12 is manually controlled by the operator both while following the paths 88 and in executing the end-of-row turn. Some systems automatically or semi-automatically control the vehicle 12 along a path 88, but rely on the operator to determine a path 94 for, and guide the vehicle 12 through, the end of row turn. Yet other systems may display a suggested end-of-row turn path 94 via the display 66 of the operator interface 52 and rely on the operator to control the speed and steering of the vehicle 12 along the path 94. Some systems may be equipped to resume automatic or semi-automatic control of speed and/or steering when the operator guides the vehicle 12 to within a given distance or orientation (e.g., 90 degrees) of the second path 88. Using existing systems, small errors in heading or path 94 through the end-of-row turn can lead to large corrections in heading and alignment while initiating automatic guidance at the beginning of a subsequent path. If the implement is not aligned with the subsequent swath at the time the implement is lowered or turned on, the implement may miss a portion of the subsequent swath, creating a skip, and/or overlap with another swath. Skips (e.g., missed sections of a swath) may result in weeds growing, time lost due to backing up and repositioning the vehicle, and/or time lost to filling in by hand. These errors and corrections may result in significantly reduced efficiency of agricultural operations. Moreover, existing systems may not take into account the speed of the vehicle 12 or the capability of the vehicle 12 to follow the path 94. Accordingly, in some instances, systems may generate an end-of-row turn path 94 that the vehicle 12 is not capable of following. The disclosed techniques may be used to generate a seven-segment, continuous rate of curvature end-of-row turn path 94 that takes into account a number of factors, including the speed and capabilities of the vehicle 12. The end-of-row turn path 94 may utilize a series of clothoid segments to generate a continuous curvature end-of-row turn path 94. The generated end of row turn path 94 may then be implemented automatically, semi-automatically, or manually.

The vehicle 12 is not capable of following a planned path 94 that includes discontinuities in position, velocity, or acceleration. Accordingly, the end-of-row turn path 94 generated by the vehicle control system 42 is continuous in terms of position, velocity, and acceleration. That is, the position, velocity, and acceleration of a planned end-of-row turn path 94 does not include instantaneous differences in position, velocity, or acceleration. For example, the final position, heading, and curvature at the end of one segment matches the starting position, heading, and curvature of the following segment. Furthermore, vehicle constraints, such as minimum turning radius and maximum turning rate (e.g., maximum slew rate) are considered in generating paths 94 that a vehicle 12 may follow. Accordingly, it may be desirable to generate paths 94 that are continuous to the second derivative of position ("C2 continuity") and are within the capabilities of the vehicle 12. Furthermore, when optimizing paths 94, it may be beneficial to consider the cost of each path in order to generate an efficient path that the vehicle 12 is capable of following.

Figure 4:
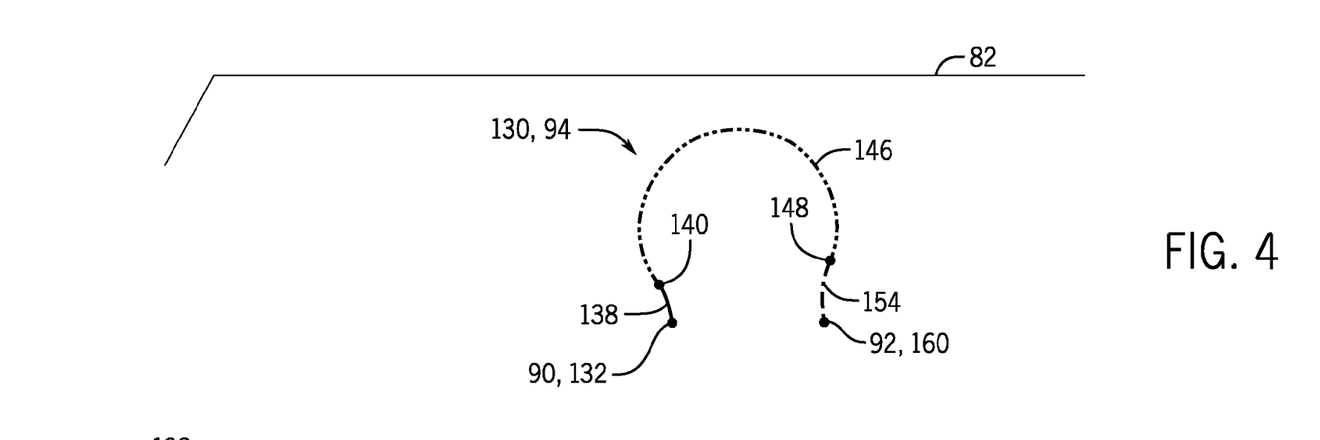
FIG. 4 is a top view of an embodiment of the three-segment non-continuous curvature end-of-row turn path.
Figure 12:
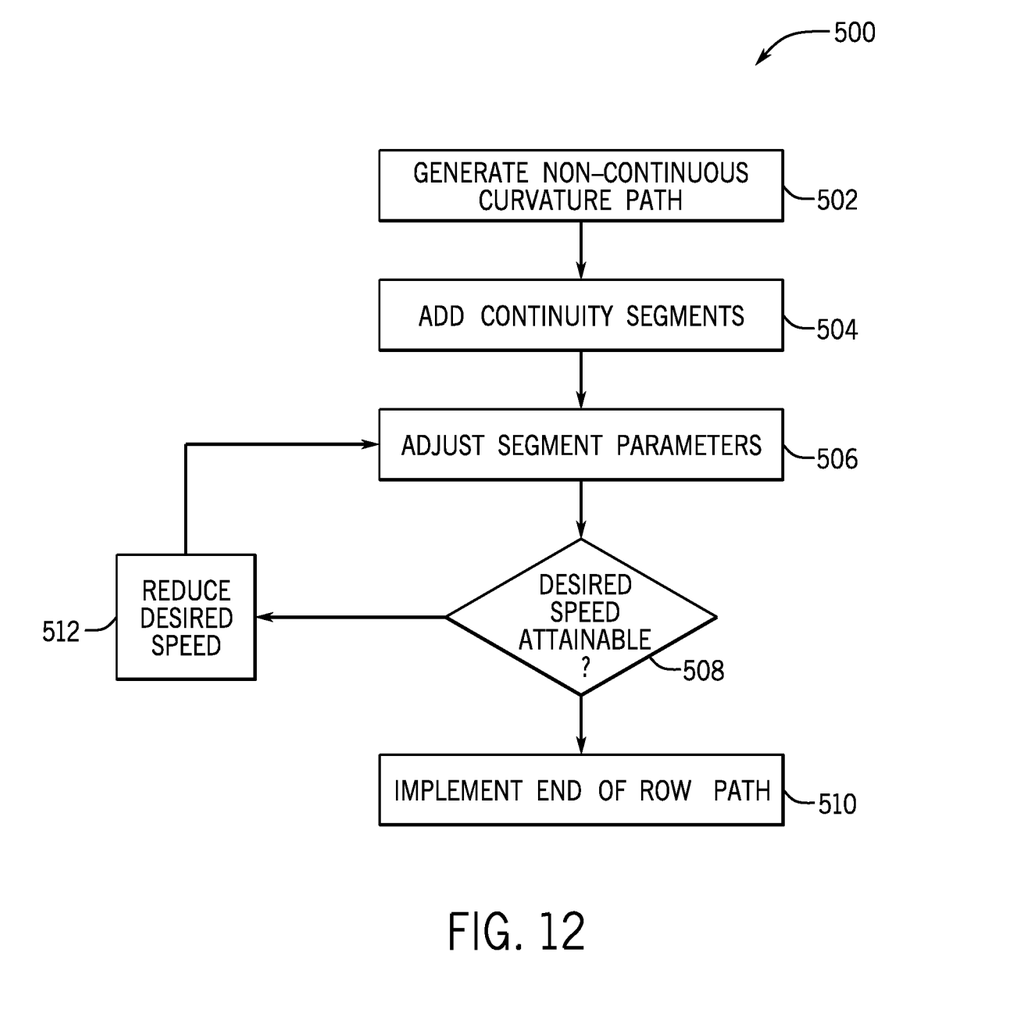
FIG. 12 is a flow chart of an embodiment of a process for generating and implementing an end-of-row turn path 94.

As discussed below with regard to FIG. 12, the vehicle control system 42 may first generate a three-segment non-continuous curvature path, which will later be made continuous by adding four clothoid continuity segments. FIG. 4 is a top view of an embodiment of the three-segment non-continuous curvature end-of-row turn path 130. The three-segment non-continuous curvature 130 path may be a series of curves and/or straight segments (e.g., a second segment 138, a fourth segment 146, and a sixth segment 154) that are joined together at nodes (e.g., a second node 140 and a fourth node 148). As shown in FIG. 4, the second segment 138 begins at the starting point 132, which may correspond to the end point 90 of a row path 88. The starting point 132 may be defined by $x_i$ and $y_i$ (e.g., the initial position of the vehicle 12). At the starting point 132, the vehicle 12 has an initial heading, $q_i$, and an initial curvature, $\kappa_i$. The second segment 138 extends from the starting point 132 to the second node 140. The fourth segment 146 extends from the second node 140 to the fourth node 148. The sixth segment 154 extends from the fourth node 148 to an end point 160, which may correspond to the starting point 90 of a the subsequent row path 88. The three-segment non-continuous curvature path 130 may be a Dubins path. A Dubins path is defined as the shortest path that connects two points in two-dimensional plane with a constraint on the curvature of the path (e.g., minimum turning radius) and with prescribed initial and terminal tangents to the path. The Dubins path is sometimes used in robotics and control theory to plan paths for wheeled robots or vehicles. Typically, a Dubins path comprises a left or right turn arc ("R" or "L"), followed by another left or right turn arc ("R" or "L") or a straight line ("S"), followed by another left or right turn arc ("R" or "L"). Accordingly, an optimal path may be one of six types—RSR, RSL, LSR, LSL, LRL, or RLR. The three-segment non-continuous curvature path 130 may or may not be based on the initial speed of the vehicle 12. The three-segment non-continuous curvature path 130 may also take boundaries 82 and/or headlands 86 into consideration when creating the non-continuous curvature path.

Figure 5:
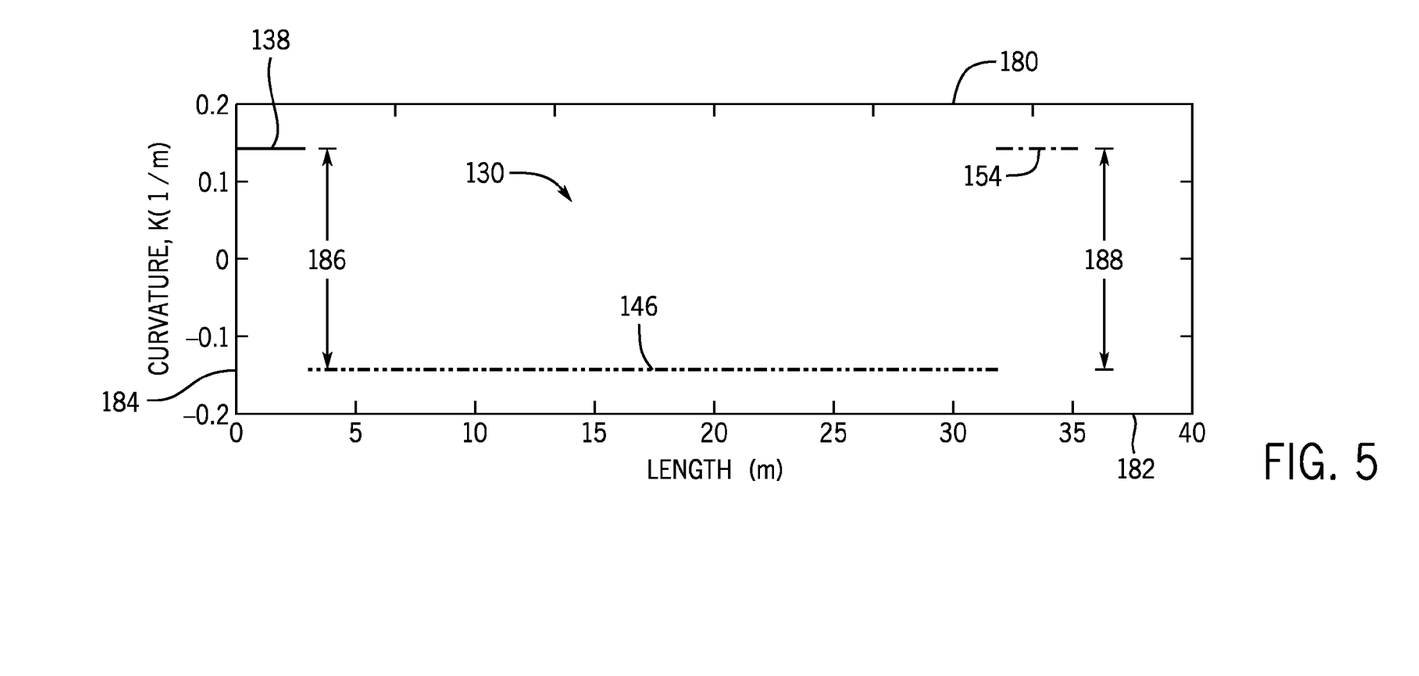
FIG. 5 is a graph 180 of the curvature of the three-segment non-continuous curvature path as a function of path length.

FIG. 5 is a graph 180 of the curvature $\kappa$ of the three-segment non-continuous curvature path 130 as a function of path length. The x-axis 182 represents distance along the three-segment non-continuous curvature path 130 in meters. The y-axis 184 represents the curvature, $\kappa$, in 1/meters at a point along the length of the three-segment non-continuous curvature path 130. In the present embodiment, the second segment 138, the fourth segment 146, and the sixth segment 154 are curves having constant radii. Accordingly, the curvatures $\kappa$ of each segment 138, 146, 154 are represented in graph 180 as horizontal lines. The instantaneous steps down 186 and up 188 in curvature $\kappa$ between the second segment 138 and the fourth segment 146, and between the fourth segment 146 and the sixth segment 154, indicate that the curvature of the three-segment path 130 is non-continuous. As previously discussed, the vehicle cannot follow a path that has a non-continuous curvature $\kappa$.

Figure 6:
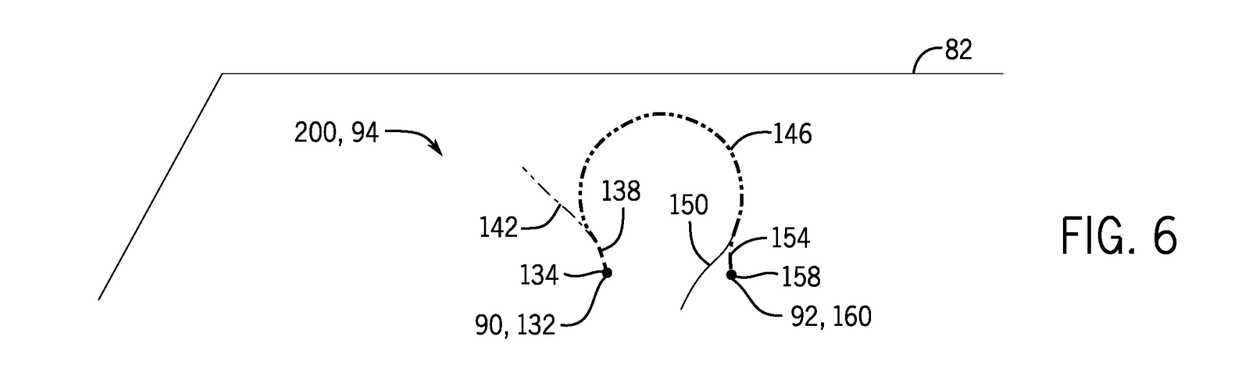
FIG. 6 is a top view of an embodiment of an intermediate seven-segment non-continuous end-of-row turn path.

The three-segment non-continuous curvature path 130 shown in FIG. 4 may be made into a continuous curvature path by inserting continuity segments (e.g., clothoid segments) at the starting point 90, at the end point 92, and in between the three segments 138, 146, 154 and then modifying the parameters of each segment. FIG. 6 is a top view of an embodiment of an intermediate seven-segment non-continuous curvature end-of-row turn path 200. To obtain the intermediate seven-segment non-continuous end-of-row turn path 200, continuity (e.g., clothoid) segments (e.g., a first segment 134, a third segment 142, a fifth segment 150, and a seventh segment 158) have been added to the three-segment non-continuous curvature path 130 shown in FIG. 4. The four clothoid continuity segments 134, 142, 150, 158 may be added between the starting point 132 and the second segment 138, between the second segment 138 and the fourth segment 146, between the fourth segment 146 and the sixth segment 154, and between the sixth segment 154 and the end point 160. The continuity segments 134, 142, 150, 158 may act as a transition from the curvature of one segment to the curvature of the proceeding segment. It should be understood that the intermediate seven-segment non-continuous end-of-row turn path 200 shown in FIG. 6 is an intermediate path. Accordingly, the end of one segment may not be aligned with the beginning of the proceeding segment. For example, in the intermediate seven-segment non-continuous end-of-row turn path 200 shown in FIG. 6, the third segment 142 and the fifth segment 150 are not aligned with the preceding or proceeding segments. As described below, the parameters of the seven segments 134, 138, 142, 146, 150, 154, 158 are adjusted to create a continuous end-of-row turn path 94.

Figure 7:
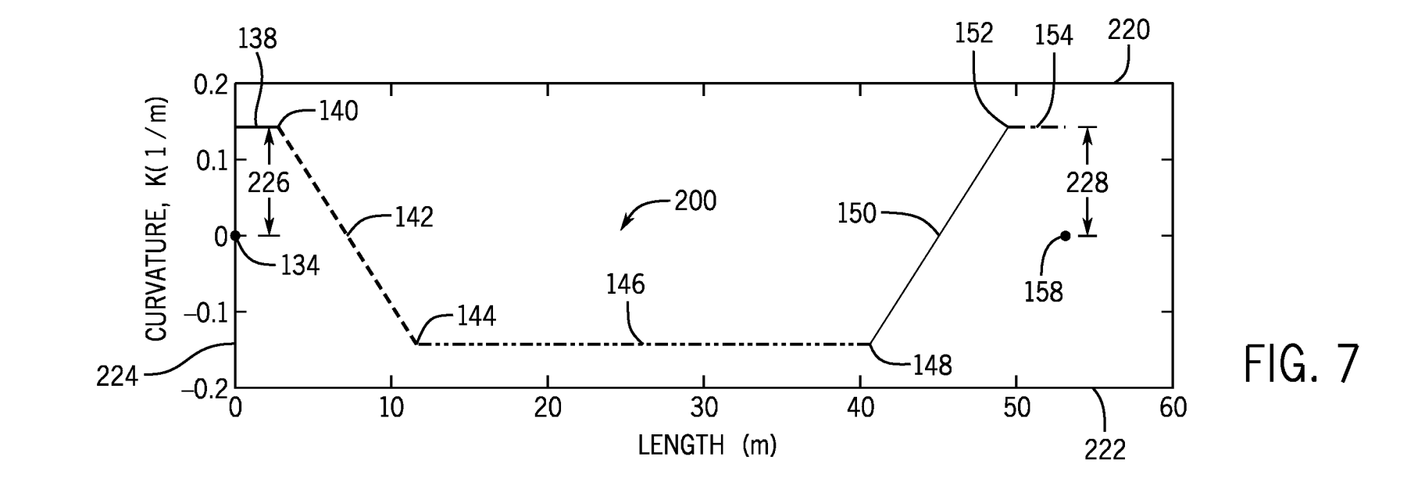
FIG. 7 is a graph of the curvature of the intermediate seven-segment non-continuous end-of-row turn path as a function of path length.

FIG. 7 is a graph 220 of the curvature $\kappa$ of the intermediate seven-segment non-continuous curvature end-of-row turn path 200 as a function of path length s. The x-axis 222 represents distance along the intermediate seven-segment non-continuous curvature end-of-row turn path 200 in meters. The y-axis 224 represents the curvature, $\kappa$, in 1/meters at a point along the length of the intermediate seven-segment non-continuous curvature end-of-row turn path 200. In the present embodiment, the second segment 138, the fourth segment 146, and the sixth segment 154 still have constant curvatures, as shown in FIG. 5. The third segment 142 has a linearly decreasing curvature $\kappa$. At the second node 140, the curvature $\kappa$ of the third segment 142 matches the curvature $\kappa$ of the second segment 138. The curvature $\kappa$ of the third segment 142 decreases linearly along its length s such that at the third node 144, the curvature $\kappa$ of the third segment 142 matches the curvature $\kappa$ of the fourth segment 146. Similarly, the fifth segment 150 has a linearly increasing curvature $\kappa$. At the fifth node 152, the curvature $\kappa$ of the fifth segment 150 matches the curvature $\kappa$ of the fourth segment 146. The curvature $\kappa$ of the fifth segment 150 increases linearly along its length s such that at the fifth node 152, of the curvature $\kappa$ of the fifth segment 150 matches the curvature $\kappa$ of the sixth segment 154. The first segment 134 may be generated taking into account a desired entry state of the vehicle 12. Similarly, the seventh segment 158 may be generated taking into account a desired exit state of the vehicle 12. The desired entry and exit states may be entered by the user (e.g., via the operator interface 52), stored in memory 56, or determined by the control system 42) and may include position, velocity, heading, curvature, rate of change of curvature, etc.

The curvature $\kappa$ of the intermediate seven-segment non-continuous end-of-row turn path 200 is continuous between the second node 140 and the fifth node 152, however, as shown in FIG. 6, the beginnings and ends of each segment are not positionally aligned (e.g., the end point of the third segment 142 does not align with the starting point of the fourth segment 146). Additionally, the curvature $\kappa$ is not continuous between the first segment 134 and the second segment 138, or between the sixth segment 154 and the seventh segment 158, as indicated by steps 226 and 228.

In the present embodiment, the segments 134, 138, 142, 146, 150, 154, 158 are clothoid segments. Clothoids, also referred to as Euler spirals, are curves with a curvature that changes linearly along the curve length. Put another way, the rate of curvature σ for a given clothoid is constant. Clothoids are C2 continuous and may take into account physical constraints, such as minimum turning radius and maximum turning rate. A clothoid may be defined as a curve having a curvature that varies linearly with curve length. The velocity $(\dot{x}(s),\dot{y}(s))$ at a distance s along the clothoid, may be described by the following equations:

$$\dot{x}(s) = \cos\left(\frac{\sigma}{2}s^2 + \kappa_i s + q_i\right), \quad (1)$$

$$\dot{y}(s) = \sin\left(\frac{\sigma}{2}s^2 + \kappa_i s + q_i\right), \quad (2)$$

where $q_i$ is the initial heading, $\kappa_i$ is the initial curvature, and σ is the rate of change of the curvature with respect to s, the distance along the clothoid. The curvature as a function of s may be described by:

$$\kappa = \sigma s + \kappa_i, \quad (3)$$

The heading as a function of s may be described by:

$$q = \frac{\sigma}{2}s^2 + \kappa s + q_i. \quad (4)$$

Thus, the position (x(s),y(s)) may be described by:

$$x(s) = x_i + \int_0^s \cos\left(\frac{\sigma}{2}\tau^2 + \kappa_i \tau + q_i\right) d\tau, \text{ and} \quad (5)$$

$$y(s) = y_i + \int_0^s \sin\left(\frac{\sigma}{2}\tau^2 + \kappa_i \tau + q_i\right) d\tau. \quad (6)$$

Thus, a clothoid segment may be based on initial position, $x_i$ and $y_i$, initial heading, $q_i$, initial curvature, $\kappa_i$, rate of curvature, σ, and path length, s. The capabilities of the vehicle (e.g., minimum turning radius, maximum turning rate) may be taken into account when determining the parameters of the clothoid segments. For example, the maximum turning rate (e.g., maximum slew rate) of the vehicle may be proportional to to rate of curvature σ. The minimum turning radius may determine a maximum value for curvature κ. As previously discussed with regard to FIGS. 4 and 5, the second, fourth, and sixth segments 138, 146, 154 of the three-segment non-continuous curvature path 130 may be defined using the clothoid equations disclosed herein. That is, the three curved segments 138, 146, 154 in the three-segment non-continuous curvature path 130 have a constant curvature, meaning that the three segments 138, 146, and 154 are clothoids with a rate of curvature σ of zero. Similarly, if the three-segment non-continuous curvature path 130 contained a straight segment, such a segment would be a clothoid segment wherein the curvature κ and the rate of curvature σ are zero. Accordingly, each segment 134, 138, 142, 146, 150, 154, 158 may be defined as a clothoid. The entire sequence of seven clothoid segments can be parameterized in a single vector:

$$z = [x_0, y_0, q_0, \kappa_0, \sigma_0, s_0, x_1, y_1, q_1, \kappa_1, \sigma_1, s_1, \ldots, x_6, y_6, q_6, \kappa_6, \sigma_6, s_6]^T \quad (7)$$

Figure 8:
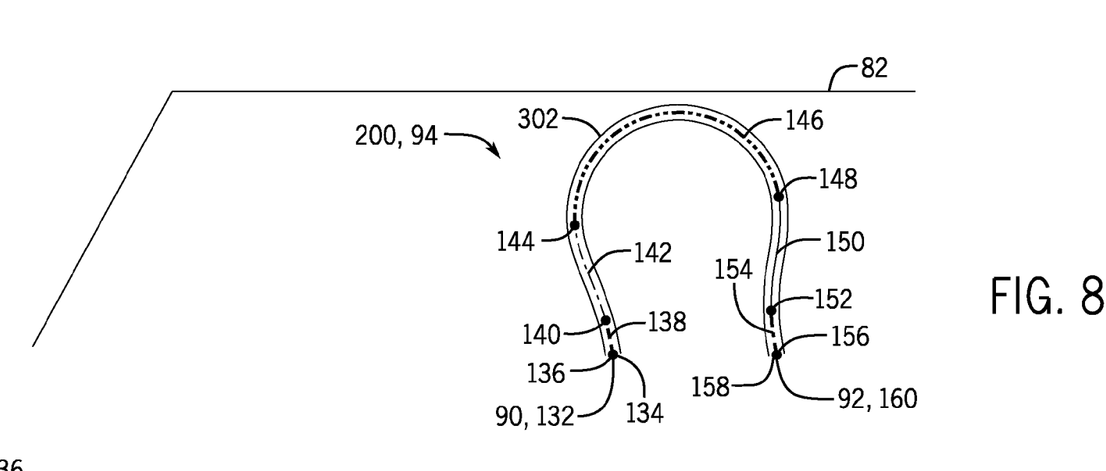
FIG. 8 is a top view of an embodiment of the C2 continuous end-of-row turn path.

The parameters of each segment 134, 138, 142, 146, 150, 154, 158 of the seven-segment non-continuous end-of-row turn path 200 may then be adjusted such that the final position, heading, and curvature of each segment matches the beginning position, heading, and curvature of the following segment (e.g., using Newton's method of optimization, or another optimization technique). The result is that the intermediate seven-segment non-continuous end-of-row turn path 200 of FIGS. 6 and 7 becomes a C2 continuous end-of-row turn path 300. FIG. 8 is a top view of an embodiment of the C2 continuous end-of-row turn path 300. The control system 42 may adjust one or more of the initial position x, y, the initial heading q, the initial curvature κ, the rate of curvature σ, and the path length s of each segment 134, 138, 142, 146, 150, 154, 158, such that the path 300 is C2 continuous. The path 300 is C2 continuous when the final position, the final heading, and the final curvature at the end of one segment (e.g., the first segment 134) matches the initial position, the initial heading, and the initial curvature at the start of the proceeding segment (e.g., the second segment 138). As shown in FIG. 8, the end of each segment 134, 138, 142, 146, 150, 154, 158 aligns with the beginning of the subsequent segment.

Additionally, the parameters of the first segment 134 may be adjusted such that the initial position, initial heading and initial curvature of the first segment 134 match the initial position, initial heading and initial curvature of the desired entry state. Similarly, the parameters of the seventh segment 158 may be adjusted such that the final position, final heading and final curvature of the seventh segment 158 match the final position, final heading and final curvature of the desired exit state. As previously discussed, the parameters of each segment 134, 138, 142, 146, 150, 154, 158 are adjusted in such a way that the rate of curvature σ does not exceed the vehicle's maximum turning rate, and/or the curvature κ does not fall below the minimum turning radius of the vehicle. The control system 42 may implement a minimum segment length (e.g., 10 centimeters), such that the path length s of each segment 134, 138, 142, 146, 150, 154, 158 remains above the minimum segment length.

The control system may also be configured to avoid boundaries 82 when generating segments 134, 138, 142, 146, 150, 154, 158 of a path 300 and adjusting the parameters of the segments. In some applications, the implement 14 may be wider than the vehicle 12. In such embodiments, the control system 42 may consider a buffer region 302 on either side of the path 300 that may be as wide or wider than the implement 14, such that the implement 14 may be capable of traversing the path 300 without coming into contact with the boundary 82.

Figure 9:
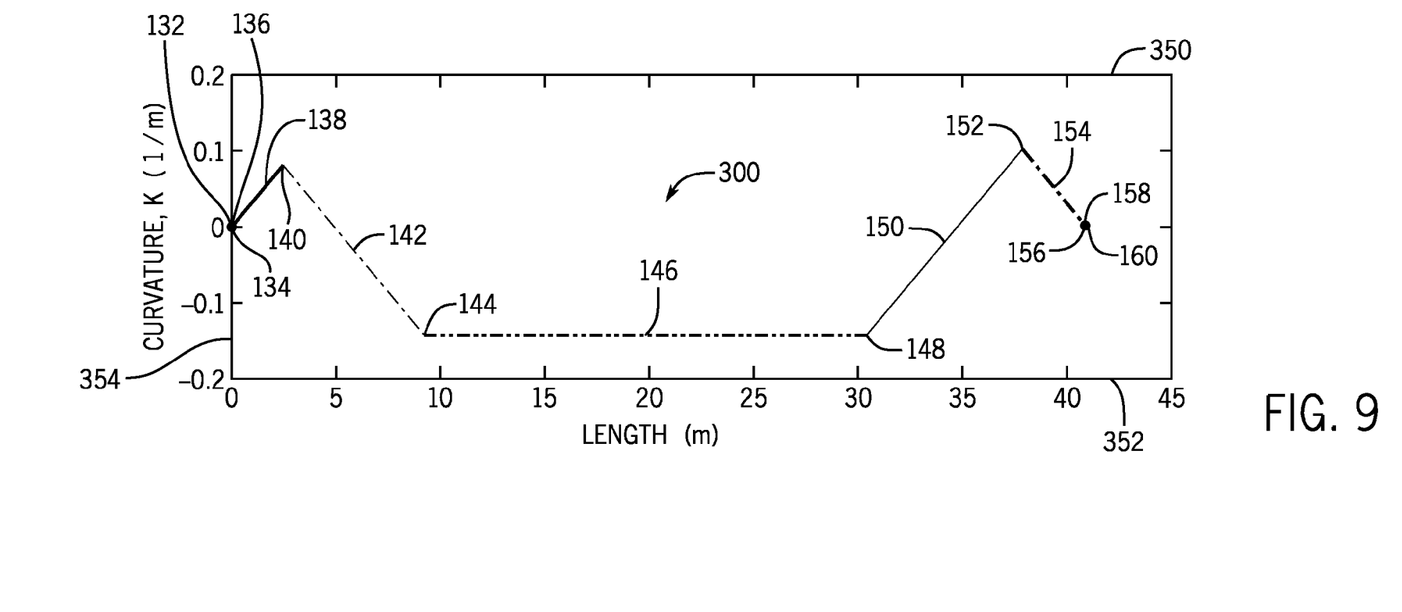
FIG. 9 is a graph of the curvature of the C2 continuous end-of-row turn path as a function of path length.

FIG. 9 is a graph 350 of the curvature κ of the C2 continuous end-of-row turn path 300 as a function of path length s. The x-axis 352 represents distance along the C2 continuous end-of-row turn path 300 in meters. The y-axis 354 represents the curvature κ in 1/meters at a point along the length of the C2 continuous end-of-row turn path 300. In the three-segment non-continuous path 130 (FIG. 5) and the intermediate seven-segment non-continuous end-of-row turn path 200 (FIG. 7), the second segment 138 and the sixth segment 154 are curves of constant curvature, shown as horizontal lines (e.g., a is zero). In the intermediate seven-segment non-continuous end-of-row turn path 200 (FIG. 7), the first segment 134 and the second segment 134 have a non-continuous curvature, as indicated by the step up 226. Similarly, the sixth segment 154 and the seventh segment 158 have a non-continuous curvature, as indicated by the step up 228. In the C2 continuous end-of-row turn path 300, however, the rates of curvature σ for the second segment 134 and the sixth segment 154 have been made non-zero, allowing for continuous curvature with the first segment 134 and the seventh segment 158, respectively. Specifically, the second segment 138 has a linearly increasing curvature κ. At the first node 136, the curvature κ of the second segment 138 matches the curvature κ of the first segment 134. The curvature κ of the second segment 138 increases linearly along its length s such that at the second node 140, of the curvature κ of the second segment 138 matches the curvature κ of the third segment 142. Similarly, The sixth segment 154 has a linearly decreasing curvature κ. At the fifth node 152, the curvature κ of the sixth segment 154 matches the curvature κ of the fifth segment 150. The curvature κ of the sixth segment 154 decreases linearly along its length s such that at the sixth node 156, the curvature κ of the sixth segment 154 matches the curvature κ of the seventh segment 158.

Figure 10:
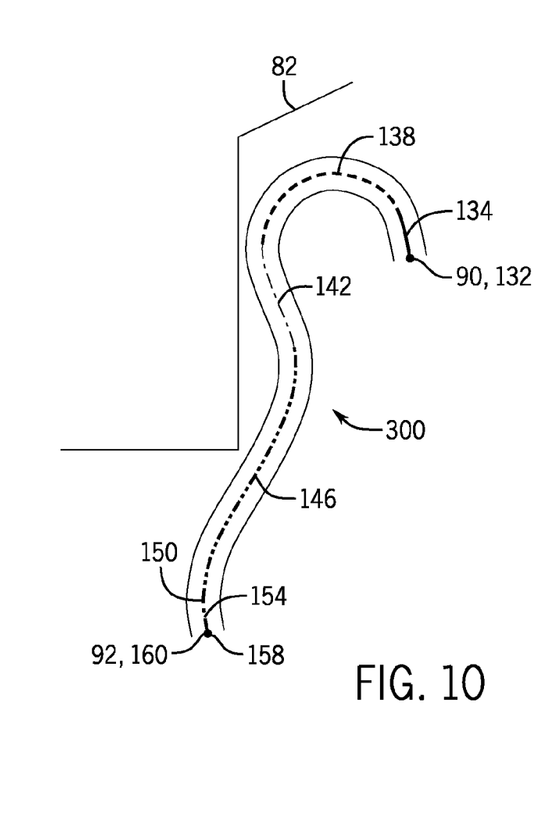
FIG. 10 is a top view of an embodiment of a C2 continuous end-of-row turn path.

FIG. 10 is a top view of an embodiment of a C2 continuous end-of-row turn path 300. The C2 continuous end-of-row turn path 300 in FIG. 8 is a relatively simple U-shaped path, which may be used, for example as an end of row turn path 94 between two adjacent rows 84. However, it should be understood that the techniques disclosed herein may be utilized to generate end-of-row turn paths 94 for more complex row 84 and/or boundary 82 configurations.

Figure 11:
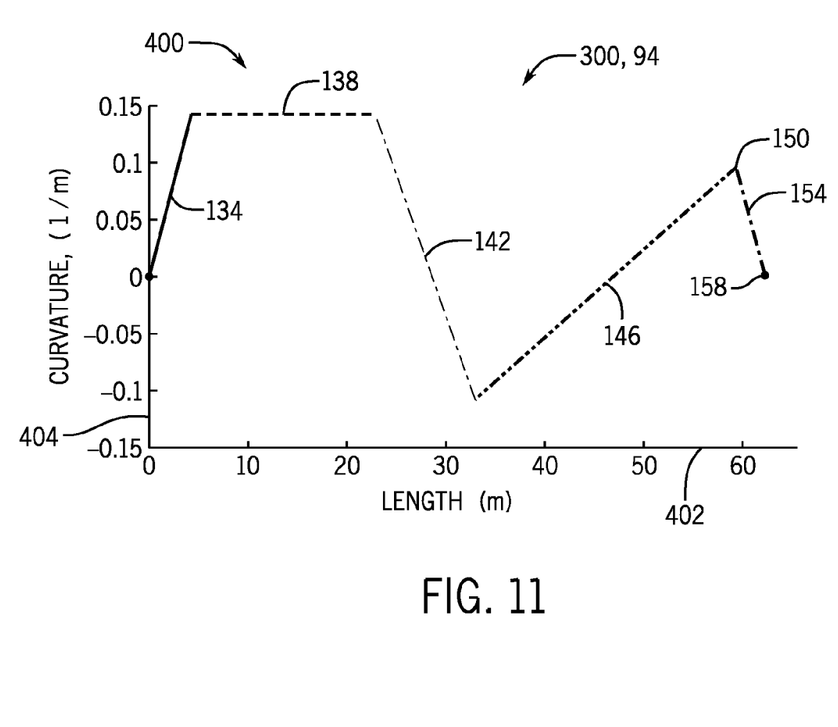
FIG. 11 is a graph of the curvature of C2 continuous end-of-row turn path as a function of path length.

FIG. 11 is a graph 400 of the curvature κ of C2 continuous end-of-row turn path 300 shown in FIG. 10 as a function of path length s. The x-axis 402 represents distance along the C2 continuous end-of-row turn path 300 in meters. The y-axis 402 represents the curvature, κ, in 1/meters at a point along the length of the C2 continuous end-of-row turn path 300. Note that as with the C2 continuous end-of-row turn path 300 shown in FIG. 9, the curvature κ of the path 300 is continuous along its length.

Though the presently disclosed embodiments include generating a three-segment continuous path 130 and adding four clothed segments 134, 142, 150, 158 at the beginning 132, the end 160, and between the 3 initial segments 138, 146, 154, resulting in a seven-segment C2 continuous end-of-row turn path 300, the same techniques may be applied using any number of segments. For example, in some embodiments, the initial non-continuous path 130 may be made of any number of segments (e.g., 1, 2, 3, 4, 5, 6, 7, 8, 9, 10, 11, 12, 13, 14, 15, 16, 17, 18, 19, 20 segments or more.) Similarly, any number of clothoid segments may be used to generate the C2 continuous end-of-row turn path 300. For example, 1, 2, 3, 4, 5, 6, 7, 8, 9, 10, 11, 12, 13, 14, 15, 16, 17, 18, 19, 20 or more clothoid segments may be added to a non-continuous path 130 and adjusted to generate a C2 continuous end-of-row turn path 300.

In order to determine an efficient end-of-row turn path 94 among a group of candidate C2 continuous end-of-row turn paths 300, 94, the vehicle control system 42 may assign a cost to each path 300, 94. The costs may include time to complete the path 300, 94, fuel consumed by the vehicle 12 while traversing the path 300, 94, and wear on the vehicle 12 while traversing the path 300, 94. The costs may be associated with length of path 300, 94, path shape (curvature and rate of curvature), and topological and/or physical properties of the surfaces 22 traversed.

For example, the time it takes for the vehicle 12 to traverse a path 94 depends on the speed that the vehicle 12 moves along the path 94. The speed of the vehicle 12 is not explicitly defined by the clothoid spline vector 112, however the speed of the vehicle may be based on the maximum vehicle speed, the maximum steering rate, the maximum centripetal acceleration (e.g., to control slippage, to enhance stability, etc.), or a combination thereof. Once the desired speed based on these factors is determined, the time of travel for the vehicle 12 along the path 94 can be determined. The length and shape of the path 94 may be adjusted in conjunction in order to obtain an efficient path. FIG. 12 is a flow chart of an embodiment of a process 500 for generating and implementing an end-of-row turn path 94. The process 500 may be stored in a non-transitory computer readable medium such as the memory component 56, (e.g., in the form of code) and executable by the processor 54. In block 502, a 3-segment non-continuous curvature path 130 is generated that includes three segments 138, 146, 154. The segments 138, 146, 154 may be curved or straight. For example, the process 500 may generate a Dubins path. A Dubins path may be defined as the shortest curve that connects two points in a two-dimensional plane, in which the curvature of the path is constrained (e.g., minimum turning radius) and initial and terminal tangents to the path are determined. In certain embodiments, the Dubins path includes a left or right turn arc segment ("R" or "L"), followed by another left or right turn arc ("R" or "L") or a straight line segment ("S"), followed by another left or right turn arc segment ("R" or "L"). Accordingly, the Dubins path may be one of six types—RSR, RSL, LSR, LSL, LRL, or RLR. The non-continuous curvature path 100 may or may not be based on the initial speed of the vehicle 12. In some embodiments, headlands 86 may be taken into consideration when creating the non-continuous curvature path 130 (e.g., by generating an end-of-row turn path 94 that remains within the headlands 86).

In block 504, the clothoid continuity segments 134, 142, 150, 158 are added between each of the segments 102, 104, 106 of the non-continuous curvature path 100 to form the continuous curvature path 112. For example, clothoid continuity segments 134, 142, 150, 158 may be added at the starting point 90, at the end point 92, and between each of the three initial segments 138, 146, 154 to form the intermediate seven-segment non-continuous curvature end-of-row turn path 200.

In block 506, the parameters of each segment 134, 138, 142, 146, 150, 154, 158 may then be adjusted (e.g., using Newton's method of optimization, or another optimization technique) to turn the intermediate seven-segment non-continuous curvature end-of-row turn path 200 of FIGS. 6 and 7 into a C2 continuous end-of-row turn path 300. Specifically, one or more of the initial position x, y, the initial heading q, the initial curvature κ, the rate of curvature σ, and the path length s of each segment 134, 138, 142, 146, 150, 154, 158, may be adjusted such that the path 300 is C2 continuous. The path 300 is C2 continuous when the final position, the final heading, and the final curvature at the end of one segment (e.g., the first segment 134) matches the initial position, the initial heading, and the initial curvature at the start of the proceeding segment (e.g., the second segment 138).

Additionally, the parameters of the first segment 134 may be adjusted such that the initial position, initial heading and initial curvature of the first segment 134 match the initial position, initial heading and initial curvature of the desired entry state. Similarly, the parameters of the seventh segment 158 may be adjusted such that the final position, final heading and final curvature of the seventh segment 158 match the final position, final heading and final curvature of the desired exit state. As previously discussed, the parameters of each segment 134, 138, 142, 146, 150, 154, 158 may be set such that the rate of curvature σ not exceed the vehicle's maximum turning rate, and/or the curvature κ not fall below the minimum turning radius of the vehicle. The control system 42 may implement a minimum segment length (e.g., 10 centimeters), such that the path length s of each segment 134, 138, 142, 146, 150, 154, 158 remains above the minimum segment length. Adjustments may also be made to avoid boundaries, either directly, or indirectly via a buffer region 302.

At decision 508, a determination is made regarding whether the vehicle 12 is capable of traversing the path 300, 94 at the desired speed. If the vehicle 12 is capable of traversing the path 300, 94 at the desired speed, the process 500 proceeds to block 510 and the path 300, 94 is implemented (e.g., the vehicle 12 is guided along the path 300, 94). If the vehicle 12 is not capable of traversing the path 300, 94 at the desired speed, the process 500 proceeds to block 512, and the desired speed of the vehicle 12 is reduced. In other embodiments, the process 500 may increase the desired speed if the vehicle 12 may be increased if the vehicle 12 is capable or traversing the path 300, 94 at a speed higher than desired speed. The process 500 then returns to block 506 and adjusts the parameters of the segments 134, 138, 142, 146, 150, 154, 158 for the modified desired speed.

In order to implement the generated end-of-row turn path 300, 94, the vehicle control system steers the vehicle 12 along the generated end-of-row turn path 300, 94. When the vehicle control system 42 implements the generated end-of-row turn path 94, the vehicle control system 42 may control the vehicle steering system 48, the vehicle speed system 47, the implement control system 50, or a combination thereof. For example, in one embodiment, the vehicle control system 42 may automatically control the vehicle steering system 48, while the operator manually controls the vehicle speed system 46 and the implement control system 50. In other embodiments, the vehicle control system 42 may control the vehicle steering system 48 and the vehicle speed system 46, while the operator manually controls the implement control system 50. In further embodiments, the vehicle control system 42 may control the vehicle steering system 48, the vehicle speed system 46, and the implement control system 50. Though these specific combinations of automatic/manual control configurations have been described, it should be understood that these are merely examples and that other combinations may be possible.

Present embodiments may use clothoid segments to generate continuous end-of-row turn paths 94 for an agricultural vehicle 12. The generated end-of-row turn paths may account for the capabilities of the vehicle 12 (e.g., minimum turning radius, maximum turning rate, etc.), the initial position of the vehicle, the initial heading of the vehicle 12, and the like. The disclosed techniques may be used in planting, harvesting, seeding and spraying operations, or many other agricultural tasks.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A method, comprising:
 generating a non-continuous curvature end-of-row turn path for an agricultural vehicle, wherein the non-continuous curvature end-of-row turn path comprises a plurality of initial segments that are curved or straight;
 adding at least one continuity segment between each of the plurality of initial segments, wherein the at least one continuity segment comprises a clothoid segment, and the initial segments and the at least one continuity segment combine to form a continuous curvature end-of-row turn path; and
 implementing the continuous end-of-row turn path, displaying the continuous end-of-row turn path, or both.

2. The method of claim 1, comprising adjusting one or more parameters of the initial segments and the at least one continuity segment such that the end-of-row turn path is C2 continuous.

3. The method of claim 2, comprising reducing the desired speed if the agricultural vehicle is not capable of traversing the continuous curvature end-of-row turn path at the desired speed; and
 adjusting the one or more parameters of the initial segments and the at least one continuity segment for the reduced desired speed of the agricultural vehicle.

4. The method of claim 1, wherein the at least one continuity segment does not exceed at least one turning capability of the agricultural vehicle.

5. The method of claim 4, wherein the least one turning capability of the agricultural vehicle comprises a minimum turning radius and a maximum turning rate.

6. The method of claim 1, wherein the at least one continuity segment is based at least in part on an initial position of the agricultural vehicle, an initial heading of the agricultural vehicle, an initial curvature of the agricultural vehicle, a rate of curvature of the agricultural vehicle, a path length of the agricultural vehicle, or a combination thereof.

7. The method of claim 1, wherein implementing the continuous end-of-row turn path comprises controlling a vehicle steering system.

8. The method of claim 7, wherein implementing the continuous end-of-row turn path comprises controlling a vehicle speed system.

9. A non-transitory computer readable medium comprising executable instructions that when executed cause a processor to:
 generate a non-continuous curvature end-of-row turn path for an agricultural vehicle, wherein the non-continuous curvature end-of-row turn path comprises a plurality of initial segments that are curved or straight;
 add at least one continuity segment between each of the plurality of initial segments, wherein the at least one continuity segment comprises a clothoid segment, and the initial segments and the at least one continuity segment combine to form a continuous curvature end-of-row turn path;
 shorten or lengthen each of the initial segments and the at least one continuity segment for a desired speed of the agricultural vehicle; and
 implement the continuous end-of-row turn, display the continuous end-of-row turn path, or both.

10. The non-transitory computer readable medium of claim 9, wherein the non-continuous curvature end-of-row turn path comprises a Dubins path.

11. The non-transitory computer readable medium of claim 9, wherein the at least one continuity segment does not exceed at least one turning capability of the agricultural vehicle.

12. The non-transitory computer readable medium of claim 11, wherein the least one turning capability of the agricultural vehicle comprises a minimum turning radius and a maximum turning rate.

13. The non-transitory computer readable medium of claim 9, wherein the at least one continuity segment is based at least in part on an initial position of the agricultural vehicle, an initial heading of the agricultural vehicle, an initial curvature of the agricultural vehicle, a rate of curvature of the agricultural vehicle, a path length of the agricultural vehicle, or a combination thereof.

14. The non-transitory computer readable medium of claim 9, wherein implementing the continuous end-of-row turn path comprises controlling a vehicle steering system.

15. A non-transitory computer readable medium comprising executable instructions that when executed cause a processor to:
generate a non-continuous curvature end-of-row turn path for an agricultural vehicle, wherein the non-continuous curvature end-of-row turn path comprises a plurality of initial segments that are curved or straight;
add at least one continuity segment between each of the plurality of initial segments, wherein the at least one continuity segment comprises a clothoid segment, and the initial segments and the at least one continuity segment combine to form a continuous curvature end-of-row turn path; and
implement the continuous end-of-row turn, display the continuous end-of-row turn path, or both.

16. The non-transitory computer readable medium of claim 15, wherein the non-continuous curvature end-of-row turn path comprises a Dubins path.

17. The non-transitory computer readable medium of claim 15, wherein the at least one continuity segment does not exceed at least one turning capability of the agricultural vehicle.

18. The non-transitory computer readable medium of claim 17, wherein the least one turning capability of the agricultural vehicle comprises a minimum turning radius and a maximum turning rate.

19. The non-transitory computer readable medium of claim 15, wherein the at least one continuity segment is based at least in part on an initial position of the agricultural vehicle, an initial heading of the agricultural vehicle, an initial curvature of the agricultural vehicle, a rate of curvature of the agricultural vehicle, a path length of the agricultural vehicle, or a combination thereof.

20. The non-transitory computer readable medium of claim 15, wherein implementing the continuous end-of-row turn path comprises controlling a vehicle steering system.

* * * * *